United States Patent [19]
Steiner

[11] 3,780,891
[45] Dec. 25, 1973

[54] ATTACHMENTS FOR VEHICLES

[75] Inventor: Hubert Steiner, Newcastle-under-Lyme, England

[73] Assignee: H. Steiner Limited, Longton, Stoke-on-Trent, England

[22] Filed: Sept. 15, 1971

[21] Appl. No.: 180,586

[30] Foreign Application Priority Data

Sept. 26, 1970 Great Britain .................. 45,926/70

[52] U.S. Cl. .............................. 214/138 C, 212/145
[51] Int. Cl. .............................................. B66f 9/00
[58] Field of Search ........................ 214/501, 78, 79, 214/80, 138, 132, 75 H, 138 C; 212/35 R, 145

[56] References Cited

UNITED STATES PATENTS 2,594,076 4/1952 Schlein ............................ 212/35 R
3,501,031 3/1970 Whitfield ......................... 214/75 H
3,027,029 3/1962 Clarke ............................. 214/501

FOREIGN PATENTS OR APPLICATIONS 352,811 4/1961 Switzerland ...................... 212/35 R

*Primary Examiner*—Gerald M. Forlenza
*Assistant Examiner*—John Mannix
*Attorney*—Alan H. Levine

[57] ABSTRACT

An attachment for a vehicle such as a truck and comprising a frame structure for mounting behind the driver's cabin and which can be extended to one side of the vehicle, a vertical post mounted at the outer end of the frame structure and having a retractible foot portion for engagement with the ground, the post serving to mount an excavator bucket or like attachment and being rotatable about its axis and tiltable in the plane of the frame structure.

4 Claims, 4 Drawing Figures 36 32 34 13 35 25 39 39 26 26a 12 37 24 40 10 14 38 11 11

12
14
11
10
40
38
37
24
36
11
26a
32
34
13
35
25
39
39
26

15
16
17
18
21
19
20
22
15a
16a
17a
18a
21a
19a
20a
22a
25
26
26a
19a
22a
25
26
32

ATTACHMENTS FOR VEHICLES

The invention relates to attachments for vehicles enabling loading, unloading, excavating or other operations to be carried out.

The invention provides an attachment for a vehicle comprising a frame structure adapted for attachment to the vehicle and capable of being extended to one side of the vehicle, the frame structure carrying a vertical post having a foot portion engageable with the ground and a rotatable upper portion adapted to receive a jib structure, and means for tilting the post in the plane in which the frame structure is extendable.

The attachment may be fitted to a truck, lorry, articulated or other road vehicle or to a railway vehicle for example. As applied to a road vehicle the frame structure is preferably attached to the vehicle behind the driver's cab but in front of the vehicle body.

The structure may be extended and retracted by hydraulic rams and the foot portion may be capable of being lowered into contact with the ground and raised by a further hydraulic ram.

In a preferred arrangement the frame structure comprises upper and lower tubular members securable to the vehicle chassis and further tubular members slidably located within the first-mentioned members and extendable and contractible by means of hydraulic rams housed within them, said post being pivotally connected to the two inner tubular members and the hydraulic rams being independently controllable to enable tilting of the post.

The jib structure may carry an excavator bucket, grab, boring tool or other equipment suited to the operations it is desired to perform. In a preferred form an excavator bucket is provided enabling the vehicle to dig a trench, offload pipes into it and fill it in without any additional equipment being required. The tiltable mounting of the post enables trenches to be dug in sloping ground at right angles to the slope, thereby reducing the excavating required, and hence the time involved, compared with digging a vertical trench in such ground.

Hydraulically operated slewing gear may be provided to rotate the jib structure and telescopic stabilizers. may be positioned between the post and the vehicle.

An embodiment of the invention will now be described. by way of example only, with reference to the accompanying drawings, in which.

Figure 1:
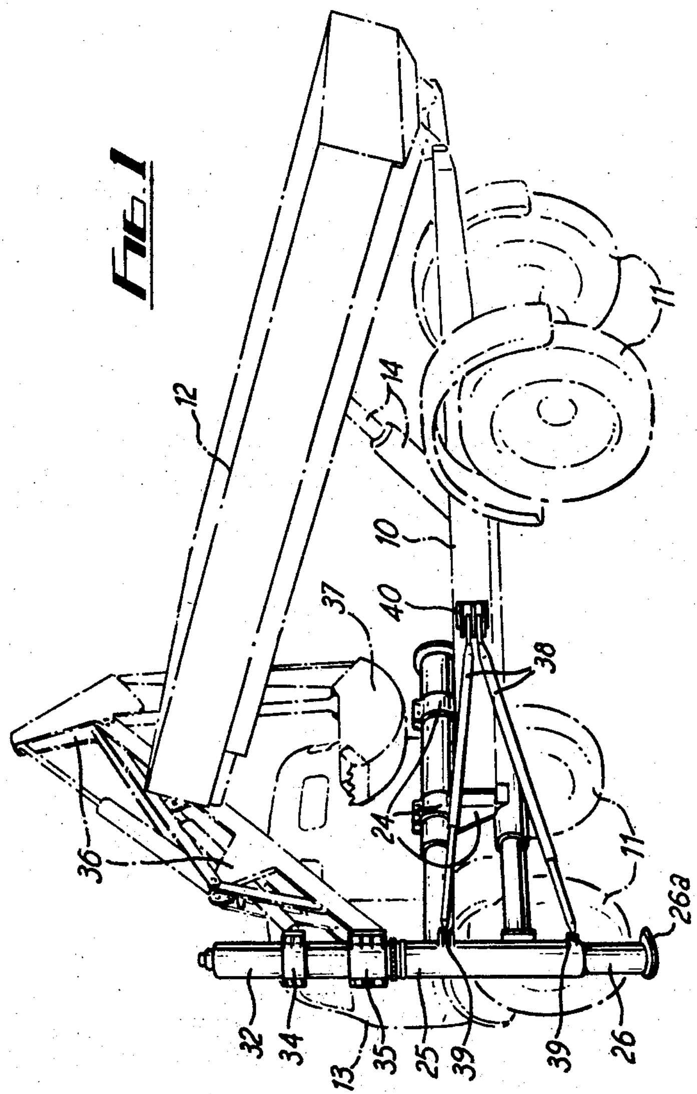
FIG. 1 is a general perspective view of a vehicle with a conventional tipping body shown in broken lines, and having an attachment according to the invention fitted to it.

Referring to the drawings, the vehicle itself is of known type having a chassis 10, wheels 11, a tipping body 12 and a driver's cab 13. The vehicle is fitted with a conventional hydraulic tipping mechanism 14 for the body and the hydraulic equipment of the present invention may be operated from this existing hydraulic system.

Behind the cab 13 but in front of the body 12 a horizontal frame structure is mounted on the chassis 10. The frame structure consists of two parallel telescopic members, one vertically above the other. The upper member comprises an outer tube 15 having a closed end 16 carrying a bracket 17 to which a ram cylinder 18 is connected. A ram 19 works in the cylinder and is connected at 20 to an inner tube 21 which is in turn pivotally connected by a pin 22 to an outer tube 25 of a vertical post. The lower member of the boom structure is similarly constructed, comprising an outer tube **15*a* having a closed end 16*a* carrying a bracket 17*a* to which a ram cylinder 18*a* is connected. A ram 19*a* works in the cylinder and is connected at 20*a* to an inner tube 21*a* pivotally connected by a pin 22*a* to the tube 25. The brackets which connect the frame structure to the vehicle chassis are indicated at 24.**

Figure 2:
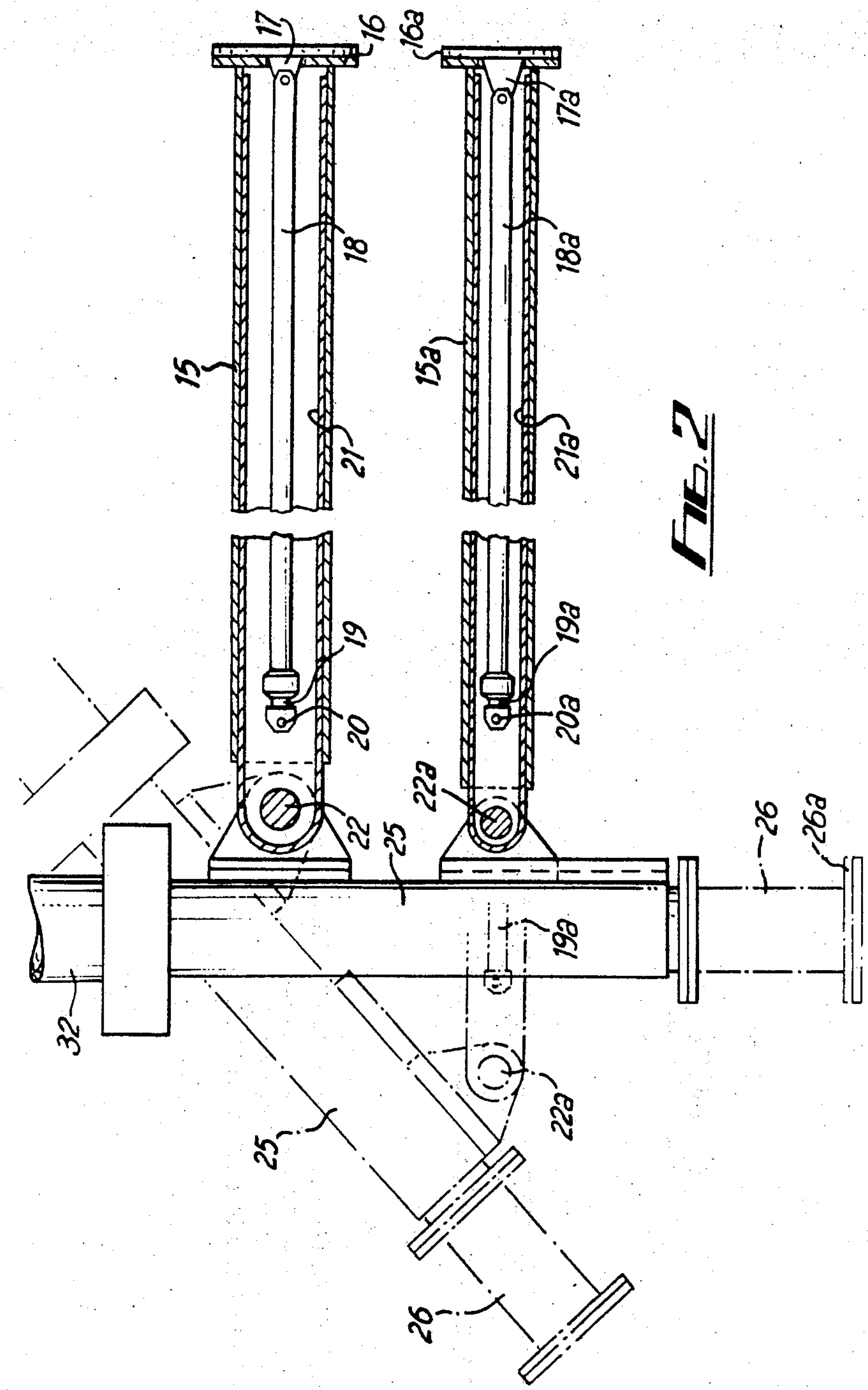
FIG. 2 is a sectional elevation of part of the attachment looking from the rear of the vehicle.
Figure 3:
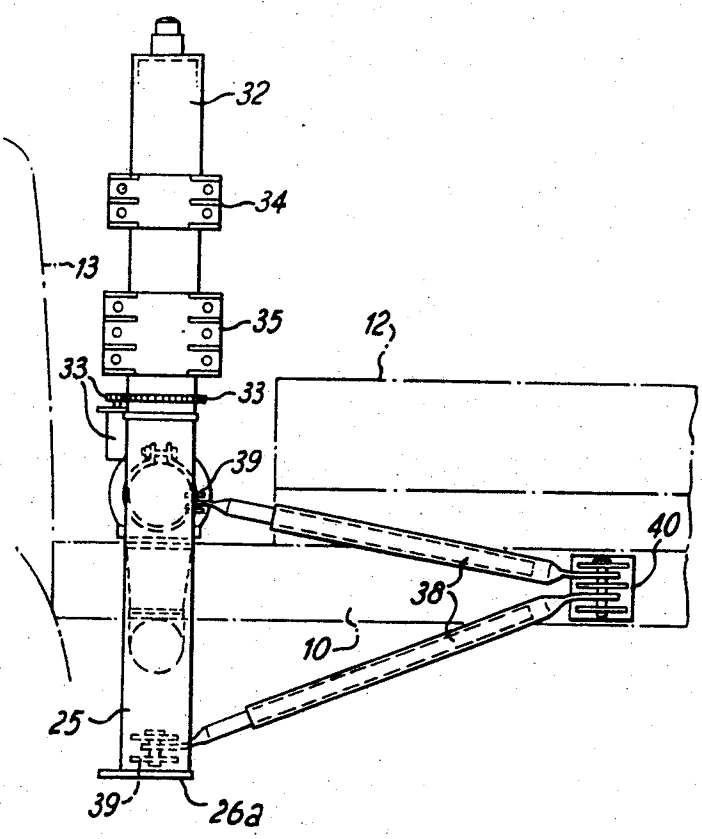
FIG. 3 is an elevation of the equipment looking from the side of the vehicle.

The vertical post comprises independent upper and lower parts, the latter including, in addition to the outer tubular member 25, an inner tubular member 26 forming an extensible leg carrying a bottom plate or foot **26*a*. The leg can be lowered and raised by a hydraulic ram (not shown) located within the post, and is shown in an extended position in broken lines in FIG. 2. FIG. 2 also shows the post in an inclined position used when operating on sloping ground, the inclination being achieved by extending the ram 19*a* by a greater extent than the ram 19. FIG. 1** shows the boom extended to the side of the vehicle and in a vertical position.

Figure 4:
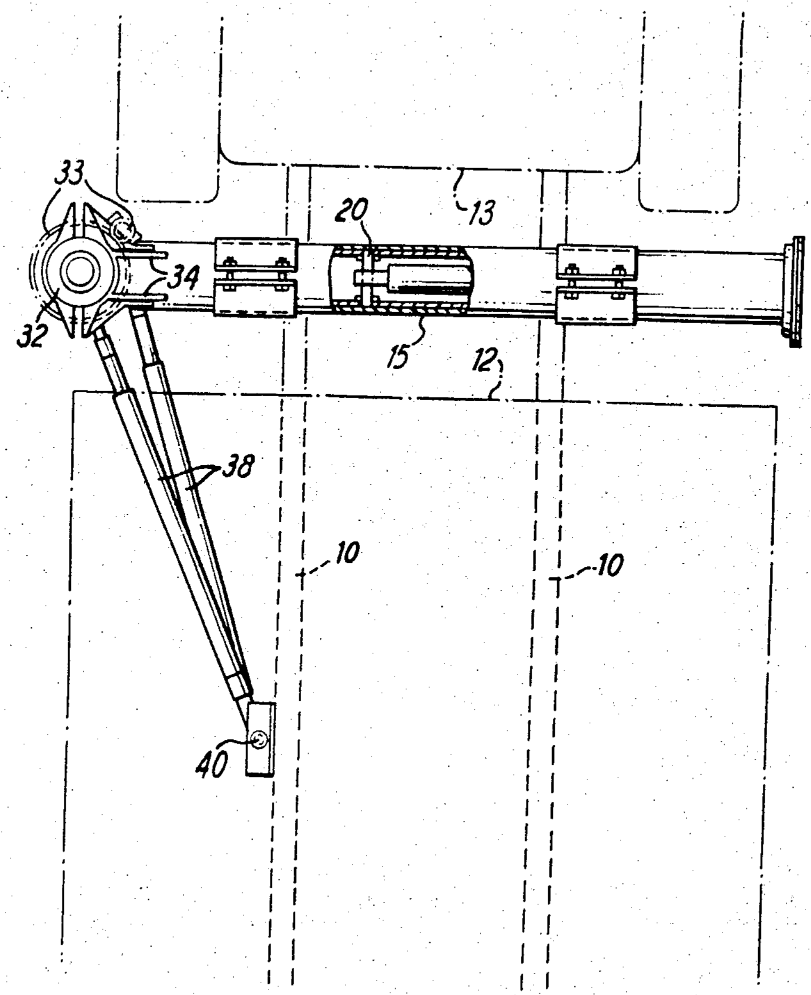
FIG. 4 is a plan view.

The upper part of the vertical post comprises a fixed inner tube (not shown) enclosed within a rotatable outer tube 32 which can be slewed through about 270° by hydraulically-operated slewing gear 33 (see especially FIG. 4). The tube 32 is provided with brackets 34, 35 which carry a jib structure 36 (FIG. 1) and an excavator bucket 37. Telescopic stabilizers 38 are connected to the post by connections 39 on the outer tube 25, the opposite ends of the stabilizers being anchored pivotally to the chassis at 40.

In its retracted position the post is neatly located between the cab 13 and the body 12 of the vehicle as shown in FIG. 4. When extended, the post is brought into a position sufficiently far from the vehicle to increase considerably the facilities for loading and unloading by means of the jib structure and bucket, and for digging trenches alongside the vehicle. The tiltable nature of the post also enables trenching to be carried out on sloping banks or other ground not level with that on which the vehicle is standing. Using the attachment, a load of pipe sections may be carried to a site, a trench dug, the pipes unloaded one at a time into the trench and the trench filled in again without any additional equipment being required. Any excess soil can also be loaded on to the vehicle and removed from the site. If desired the leg 26 may be fitted with a wheel or wheels, preferably spring loaded so that the vehicle may move slowly forwards while trenching or the like without raising the leg.

Control of the hydraulic equipment may be effected by means of a group of control levers or the like, preferably mounted in the driver's cab, operating a system of valves in accordance with normal hydraulics practice.

Various modifications may be made without departing from the invention. For example the slewing gear and the construction of the post and frame structure could be altered, and the post may be fitted with a bucket grab, boring tool, crane hook or other requipment to enable diferent operations to be carried out. The attachment could also be fitted to other types of vehicle including articulated road vehicles and railway wagons.

I claim:

1. A vehicle fitted with a loading and unloading attachment comprising a frame structure mounted on the vehicle and including an upright post, means for moving said post bodily in a direction transversely of the vehicle from an out-of-use position to an extended position at one side of the vehicle, in both of which postions the post is upright, a retractable ground-engaging foot carried by said post, an upper portion of said post being rotatable about the longitudinal axis of the post and carrying a jib structure, and means for tilting the post, with respect to the vehicle and when the post is extended, in the transverse plane in which it moves during its travel to said extended position so that the foot may be properly oriented to engage a sloping ground surface.

2. An attachment according to claim 1 wherein said frame structure comprises upper and lower tubular members securable to the vehicle chassis and further tubular members slidably located within the first-mentioned members and extendable and contractible by means of hydraulic rams housed within them, said post being pivotally connected to the two inner tubular members and the said means for tilting the post being independently controllable hydraulic rams.

3. An attachment according to claim 1 including hydraulically operated slewing gear coupled to the upper portion of said post to rotate same about its axis.

4. An attachment according to claim 1 including telescopic stabilizers connected to said post and adapted for connection to the vehicle.

* * * * *